SILICON RESISTOR

Original Filed Dec. 13, 1966 2 Sheets-Sheet 1

INVENTOR
William W. Plumlee
Kenneth M. Durham, Jr.
BY Robert J. Crawford
ATTORNEY Dec. 14, 1971 K. M. DURHAM, JR., ET AL 3,626,588

SILICON RESISTOR

Original Filed Dec. 13, 1966 2 Sheets-Sheet 2

3,626,588
SILICON RESISTOR
Kenneth M. Durham, Jr., 629 W. 15th, and William W. Plumlee, 641 Spring Lane, both of Plano, Tex. 75074
Continuation of application Ser. No. 601,371, Dec. 13, 1966. This application Feb. 24, 1970, Ser. No. 14,722
Int. Cl. H01c 7/04
U.S. Cl. 29—612 7 Claims

ABSTRACT OF THE DISCLOSURE

This disclosure relates to silicon resistors, and more particularly to a high resistance silicon resistor having a high positive temperature coefficient of the type wherein the resistive element is embedded in, but isolated from, a substrate, and to the method of making the same.

This application is a continuation of copending application Ser. No. 601,371, filed Dec. 13, 1966, now abandoned.

Resistors having high temperature coefficients (TC) have found wide spread use in circuits requiring temperature compensation to insure stability of the circuits with changes of temperature. Silicon, a material having a relatively high positive TC of about 7000 p.p.m./° C. when doped to between 0.25 to 20.0 ohm-cm. resistivity, is used extensively for this purpose. The maximum upper limit of resistivity is about 30 ohm-cm., for as the doping level is decreased much beyond this point, the TC becomes negative at too low a temperature for practical use. Therefore, to obtain a high TC, low resistivity silicon must be used, which, in turn, necessitates a small sectional area and a long length in order to obtain high resistance values.

According to the present state of the art, a temperature sensitive silicon resistor is made by bonding an appropriately doped bar of silicon to a support such as a ceramic base. Metal terminals are bonded to each end of the bar in order to make electrical contact. Due to the fragility of the thin silicon bar (the minimum bar thickness and width being about .025"), the upper resistance of such resistors is about 10,000 ohms. In order to obtain the required high TC, the silicon bar must be doped to have a resistivity of between 0.25 to 20.0 ohm-cm. Since the resistance of a resistor is given by the equation $R=\partial L/A$, where $\partial$ is the specific resistance of the resistor material, L is the length of the resistor and A is the cross sectional area, the length must be great and the cross sectional area must be small in order to produce a high resistance resistor. Due to the required small size of the completed resistor and the lack of strength of a silicon bar having a very small cross-section, neither of the required conditions of the small cross-section nor long length is possible using the silicon bar approach.

It is, therefore, an object of the invention to provide a method of making a high resistance, temperature sensitive, silicon resistor having a small size and good strength.

A further object is a high resistance, temperature sensitive, silicon resistor of small size and good strength.

The novel features believed to be characteristic of the invention are set forth with particularity in the appended claims. The invention itself, however, as well as further objects and advantages thereof, may best be understood by reference to the following detailed description when read in conjunction with the appended claims and the accompanying drawings, wherein:

FIGS. 2–5 are sectional views of the wafer shown in FIG. 1, taken along the section line 2—2, illustrating the subsequent process steps of the invention;

FIG. 6 is an isometric view of a high TC silicon resistor made according to the method of the invention; while

In brief, the invention involves etching away a portion of a doped silicon wafer which can be either N or P conductivity type, to leave a raised serpentine pattern or any other suitable configuration on one surface of the wafer, which pattern later becomes the resistor element. A layer of insulating material, for example silicon oxide, is grown or deposited upon the entire surface of the wafer including the raised pattern. A thick layer of material, for example polycrystalline silicon, is then deposited on the insulating layer, thereby forming the substrate for the final device. The opposite surface of the silicon substrate is subjected to a lapping operation to remove substantially all of the silicon substrate except the silicon that is defined by the raised pattern. At this stage, the resistor element is a serpentine pattern of silicon material embedded in polycrystalline material with an insulating isolation layer of silicon oxide interposed between the resistor element and the polycrystalline material, which polycrystalline material now becomes the substrate of the resistor. The resistor is completed by the addition of a protective layer of silicon oxide on the surface of the resistor element and the polycrystalline material, followed by deposition of metallic terminals through windows in the silicon oxide layer to the ends of the resistor.

Figure 1:
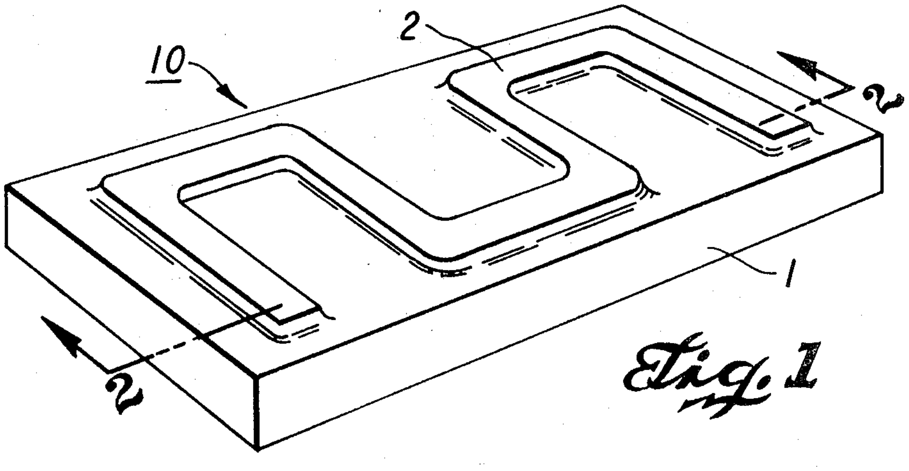
FIG. 1 is an isometric view of a silicon wafer illustrating, for example, a raised serpentine pattern of the resistor element as the first step in the process of the invention.
Figure 2:
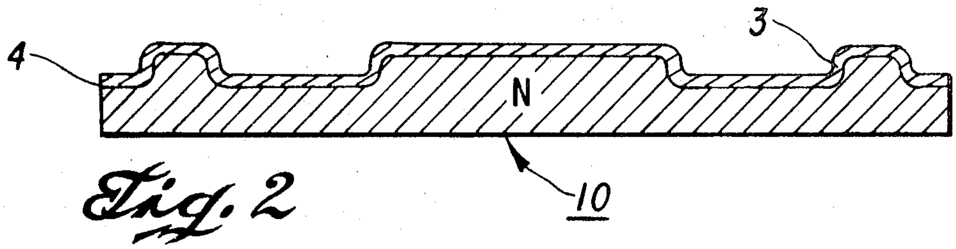

Referring now to the figures of the drawings, FIG. 1 represents an isometric view of a silicon starting wafer with a raised serpentine pattern of silicon on its surface, produced by certain steps of the process of the invention to be described hereinafter. The wafer, although changing in structure as it passes through successive process steps, will be generally designated in this and subsequent figure by the reference numeral 10. During the fabrication process it is customary for each slice of silicon to contain a large number of wafers of similar design. Toward the end of the process, the individual wafers are separated from the common slice and made into discrete devices. It shold be noted at this point that the figures are not drawn to scale, emphasis being placed on visually representing the main aspects of the invention. For example, the oxide layers shown in the various figures of the drawings are of the order of only 10,000 A. while the wafer thickness is about 15 milliinches. Obviously, the oxide layers can not be clearly shown to scale.

The wafer 10 is formed from an N conductivity type silicon starting wafer 1 having a resistivity of about 15 ohm-cm. The starting wafer 1 can be either N or P conductivity type, and can be doped to different levels depending upon the desired resistance of the finished device, although an N conductivity type starting wafer 1 is described herein for illustration purposes only.

A layer of photoresistive material, such as KMER, made by Eastman Kodak Company, is placed on the surface of the silicon wafer 10, exposed and developed to form a mask with windows exposing certain portions of the surface of the wafer. The mask and exposed surface of the wafer are subjected to an etching condition for a period of time sufficient to form the raised serpentine pattern of the resistor element 2 of about 1.5 milliinches in height, as illustrated in FIG. 1.

After the mask is removed, the wafer 10 is placed in a conventional furnace containing an oxidizing atmosphere of air or steam for about one hour at about 1200° C. in order to grow the silicon oxide layer 3 of about 10,000 A. in thickness on the wafer surface 4, as shown in FIG.

2, said figure being a sectional view of FIG. 1 along the line 2—2 after the addition of the silicon oxide layer 3. Instead of silicon oxide, the insulating layer 3 may be produced by forming a layer of silicon nitride or silicon carbide on the surface 4 of the wafer 10.

Figure 3:
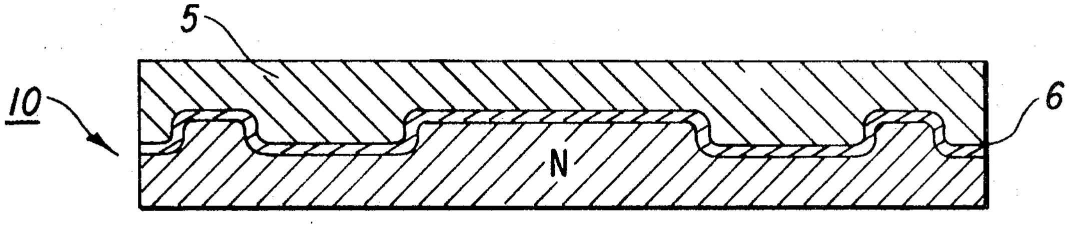

The wafer 10 is then placed in a conventional reactor furnace to form a layer 5 of material, polycrystalline silicon, for example, to a thickness of approximately 15 milliinches on the surface 6 of the silicon oxide layer 3, as illustrated in FIG. 3. The composition of the layer 5 is essentially immaterial, since the interposing insulating layer 3 of silicon oxide between the resistor element 2 and the layer 5 effectively insulates and isolates the resistor element 2, and thus the layer 5 can be made from other materials, such as silicon carbide SiC, for example.

Figure 4:
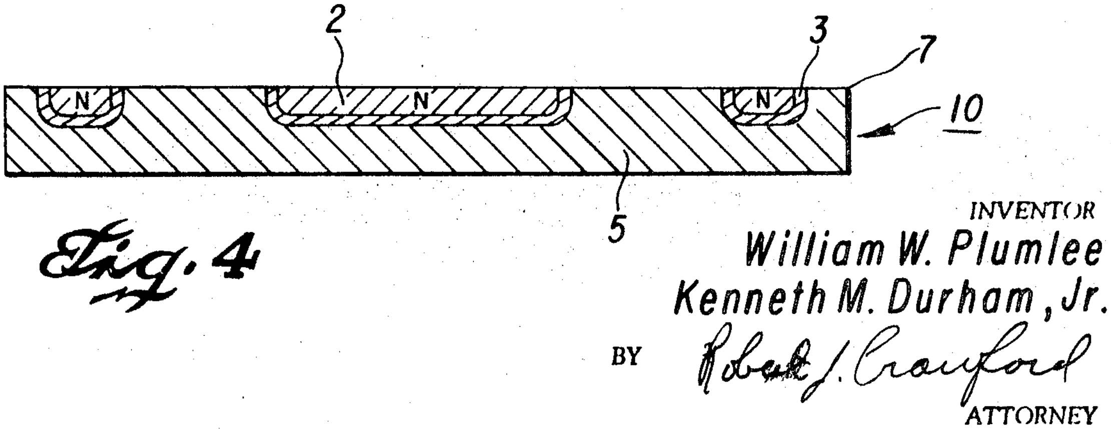

After removal of the wafer 10 from the reactor furnace, the monocrystalline silicon starting wafer 1 is substantially removed down to the surface 7 of the wafer 10 by lapping, as shown in FIG. 4. The remaining monocrystalline silicon is that portion of the doped silicon starting wafer 1 that formed the resistor element 2, as described in conjunction with FIG. 1. It should be noted that due to the inaccuracy in lapping, the wafer 10 which is usually bowed, the lapping operation removes a portion of the silicon oxide layer 3. This insures the complete removal of all monocrystalline silicon except for the resistor element 2 within the insulating silicon oxide layer 3.

The wafer 10, which now is the resistor element 2 embedded in the polycrystalline substrate 5, is again oxidized in order to form a protective silicon oxide layer 8 on the surface 7 of the wafer 10. The silicon oxide layer 8 is formed by placing the wafer 10 in an oxidizing atmosphere of air or steam for about one hour at about 1200° C. After removal of the wafer 10 from the furnace used to form the oxide layer 8, a photoresist mask is formed on the surface of the oxide 8 in order that two windows 9 can be etched in the oxide layer by the use of a dilute hydrofluoric acid etch, such windows, among other things, being shown in FIG. 5.

In order to effect good ohmic contact between the metal terminals to be deposited later and the ends of the resistor element 2, heavily doped diffused N+ conductivity type regions 11 are formed by subjecting the portion of the resistor element 2 beneath each window 9 in the oxide layer 8 to a phosphorus doping impurity.

Many different methods of forming the diffused regions 11 can be used. However, a convenient method is to use phosphorous oxychloride $POCl_3$ in a carrier gas such as nitrogen. The wafer 10 is placed within a conventional diffusion furnace at a temperature of about 1100° C. The furnace (not shown) is purged for five minutes with a mixture of nitrogen having a flow rate of about 2 liters/min. and oxygen having a flow rate of about 200 cc./min. Nitrogen, after bubbling through a container of liquid $POCl_3$ at a rate of 50 cc./min. is introduced into the furnace for about fifteen minutes. After a final purge of five minutes using the same gas mixture as the initial purge, the wafer 10 is removed from the furnace.

The metallic terminals 12 are formed by depositing a layer of aluminum by conventional methods on the surface 13 of the silicon oxide layer 8 and on the diffused regions 11 defined by the two windows 9. A photoresist mask is formed on the surface of the aluminum, which exposes all of the aluminum layer except that portion of said layer within the windows 9. The mask and exposed portions of the aluminum layer are subjected to an etching condition for a period of time sufficient to remove all of the aluminum layer except aluminum terminals 12 within the windows 9 in the silicon oxide layer 8 and in contact with the diffused regions 11.

To form good ohmic contact between the aluminum terminals 12 and the diffused region 11, the wafer 10 is again placed in a furnace containing a neutral atmosphere, nitrogen for example, at about 615° C. for about five minutes in order to alloy the aluminum terminals 12 to the silicon resistor element 2. The resistor fabrication is practically completed except for separating the individual wafers from the slice, bonding each wafer to a header, and making connections between each wafer and the corresponding header leads.

Figures 5, 6:
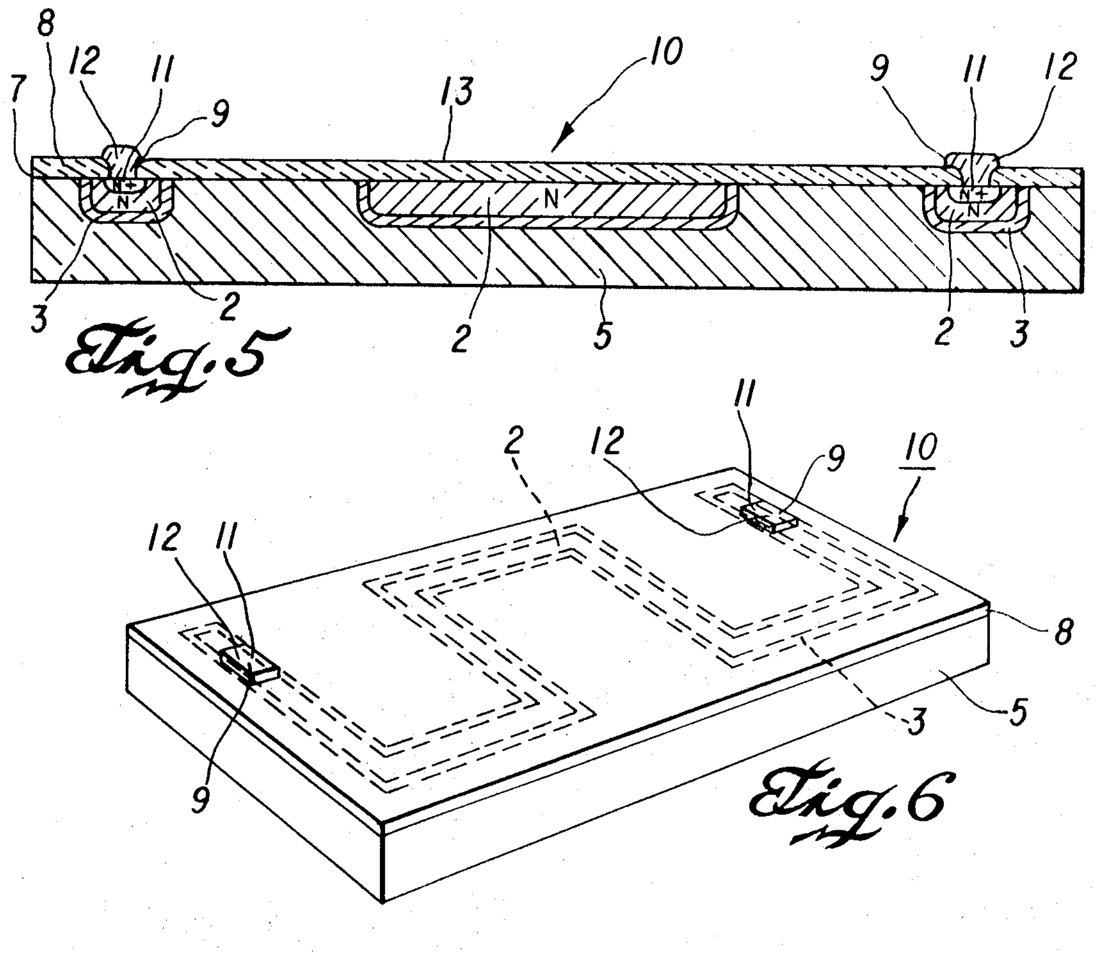

In FIG. 6 is shown an isometric view of the completed resistor made according to the invention. The resistor element 2 can be of very small cross-section and of long length which is impossible using a bar of silicon due to the resistor element being embedded in the relatively thick supporting material 5 which in the embodiment of the invention, by way of example only, is polycrystalline silicon. The insulating layer 3 effectively isolates the resistor element 2 from the support material 5, and while the insulating layer has been described as silicon oxide for descriptive purposes only, such a layer can easily be formed of silicon nitride ($Si_3N_4$), silicon carbide (SiC), or other insulating materials compatible with the silicon resistor element. The resistor element 2 can be formed in an infinite number of configurations to produce a resistor having the desired resistance value. Throughout the manufacturing process the resistor element 2 is supported by either the silicon substrate 1 or the polycrystalline material 5. By such support, a much smaller cross-sectional area of the resistor element can be realized as opposed to the silicon bar illustrated in FIG. 7. Resistor values as high as 5,000,000 ohms are realizable by the method of the invention.

Figure 7:
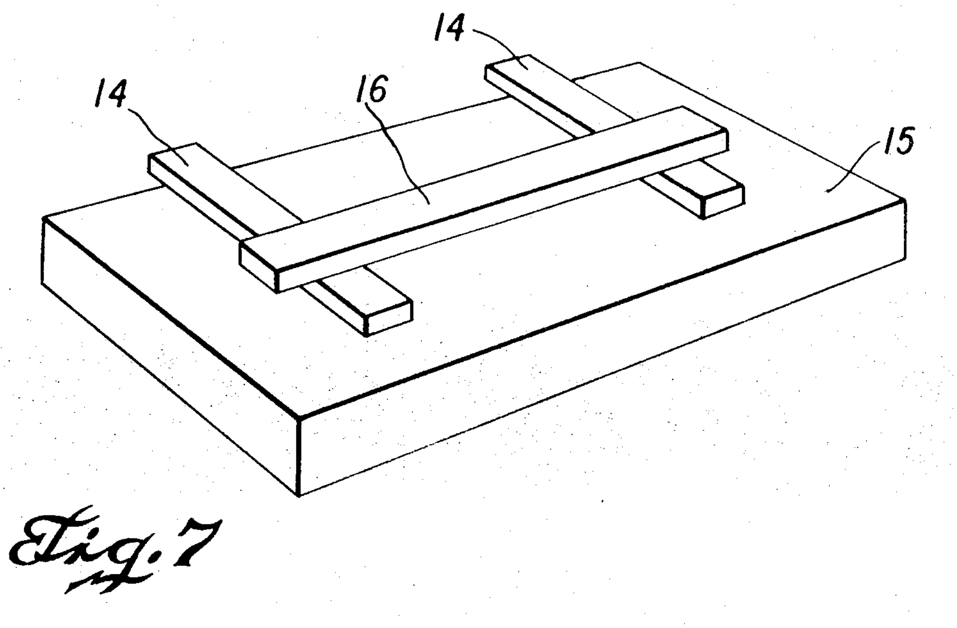
FIG. 7 is an isometric view of a high TC silicon resistor made according to the present state of the art.

In FIG. 7 is illustrated a high temperature coefficient silicon resistor fabricated according to the present art. Two terminal tabs 14 are bonded down to the opposite ends of a support 15 such as a ceramic base. The thin silicon bar 16 is alloyed at each end to one of the terminal tabs 14. Due to the relative large size of the silicon bar 16 required for handling purposes during fabrication of the resistor, the maximum practical resistance obtainable is quite low, being in the order of 10,000 ohms.

Although a preferred embodiment of the invention has been described in detail, it is to be understood that various changes, substitutions and alterations can be made therein without departing from the spirit and scope of the invention as defined by the appended claims.

What is claimed is:

1. A method of fabricating a discrete silicon resistor comprising the steps of:

(a) forming an etching mask on one surface of a monocrystalline silicon substrate of one conductivity type doped to a resistivity of about .25 to 20.0 ohm-centimeters, said mask exposing said one surface except for an elongated pattern that defines an elongated resistor element of length L having two ends;

(b) etching the exposed portion of said one surface, leaving a raised portion of cross-sectional area A on said one surface of the substrate beneath the etching mask in conformity with said pattern to form said resistor element, the ratio of A to L being less than the ratio of said resistivity to 10,000;

(c) removing the etching mask;

(d) forming a first insulating layer on the remaining portions of said one surface of the substrate, and on all surfaces exposed by said etching steps;

(e) reactively depositing a layer of material on the surface of said first insulating layer;

(f) removing substantially all of the silicon substrate except for said resistor element, leaving an opposite surface exposing said resistor element now being isolated by said first insulating layer and embedded in said layer of material;

(g) forming a second insulating layer on said opposite surface;

(h) forming a window in said second insulating layer at each end of said embedded resistor element exposing said ends; and (i) forming electrically conductive metal terminals in each of said windows making contact to each of said ends of said resistor element.

2. The method as defined in claim 1, including the step of forming a highly doped region of said one conductivity type in each end of said resistor element, said highly doped regions being formed prior to the formation of said metallic terminals.

3. The method as defined in claim 1 including the step of alloying said metallic terminals to said resistor element by heating at about 615° C.

4. The method as defined in claim 1 wherein said first insulating layer is silicon oxide, about 10,000 A. thick, and said second insulating layer is also silicon oxide.

5. In the method as defined in claim 1 wherein said first insulating layer is silicon nitride, about 10,000 A. thick.

6. In the method as defined in claim 1 wherein said insulating layer is silicon carbide, about 10,000 A. thick.

7. In the method as defined in claim 1 wherein said layer of material is polycrystalline silicon.

References Cited

UNITED STATES PATENTS

| | | | |
|---|---|---|---|
| 3,122,817 | 3/1964 | Andrus. | |
| 3,184,823 | 5/1965 | Little et al. | |
| 3,312,879 | 4/1067 | Godejahn. | |
| 3,320,485 | 5/1967 | Buie. | |
| 3,349,474 | 10/1967 | Rauscher. | |
| 3,377,697 | 4/1968 | Hobbs | 29—621 |
| 3,407,479 | 10/1968 | Fordemwalt et al. | |
| 3,412,295 | 11/1968 | Grebene. | |

JOHN F. CAMPBELL, Primary Examiner

W. TUPMAN, Assistant Examiner

U.S. Cl. X.R.

29—621, 578

UNITED STATES PATENT OFFICE

CERTIFICATE OF CORRECTION

PATENT NO. 3,626,588 Dated December 14, 1971

KENNETH M. DURHAM, JR. et al

It is certified that error appears in the above-identified patent and that said Letters Patent is hereby corrected as shown below:

-- In the heading it should appear that the Assignee is Texas Instruments Incorporated, Dallas, Texas. --

Signed and sealed this 30th day of May 1972.

(SEAL)
Attest:

EDWARD M.FLETCHER,JR.
Attesting Officer

ROBERT GOTTSCHALK
Commissioner of Patents